(12) United States Patent
Joergl et al.

(10) Patent No.: US 7,757,679 B2
(45) Date of Patent: Jul. 20, 2010

(54) INTEGRATED CHARGE AIR AND EGR VALVE

(75) Inventors: Volker Joergl, Ortonville, MI (US); Timm Kiener, Lake Orion, MI (US); Olaf Weber, Bloomfield Hills, MI (US); Robert S. Czarnowski, Oxford, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 106 days.

(21) Appl. No.: 12/224,414

(22) PCT Filed: Mar. 22, 2007

(86) PCT No.: PCT/US2007/007092
§ 371 (c)(1),
(2), (4) Date: Aug. 26, 2008

(87) PCT Pub. No.: WO2007/111926
PCT Pub. Date: Oct. 4, 2007

(65) Prior Publication Data
US 2009/0013978 A1    Jan. 15, 2009

Related U.S. Application Data

(60) Provisional application No. 60/784,569, filed on Mar. 22, 2006.

(51) Int. Cl.
F02B 47/08    (2006.01)

(52) U.S. Cl. .............................. 123/568.12; 123/568.19

(58) Field of Classification Search ............ 123/568.17, 123/568.12, 568.19, 568.23, 568.24, 568.15; 60/278, 280, 298, 605.1, 605.2; 701/108
See application file for complete search history.

(56) References Cited

U.S. PATENT DOCUMENTS

| 5,617,726 | A * | 4/1997 | Sheridan et al. ............ 60/605.2 |
| 2003/0000497 | A1 | 1/2003 | Brosseau et al. |
| 2005/0145229 | A1 | 7/2005 | Eriksson et al. |

FOREIGN PATENT DOCUMENTS

| EP | 1 103 715 | 5/2001 |
| FR | 2 856 745 | 12/2004 |
| FR | 2 856 746 | 12/2004 |
| FR | 2 861 808 | 5/2005 |

* cited by examiner

Primary Examiner—Mahmoud Gimie
(74) Attorney, Agent, or Firm—Warn Partners, P.C.

(57) ABSTRACT

An engine assembly (10) comprising an engine, a plurality of coolers, a plurality of bypasses, and at least one actuator (32). The engine has an exhaust manifold and an intake manifold. The gaseous fluid exiting the exhaust manifold is recirculated to the intake manifold. The exhaust gas passes through either an air cooler or a bypass. At least one actuator is operably connected to the plurality of bypasses. The bypasses have a valve (28, 30) which is actuated to control the flow of the gaseous fluid through the bypass as both the bypass and the cooler. Therefore, when a single actuator is used to control the valves in both bypasses, the valves in the bypasses have the same relationship with the inlets so that a single actuator movement will control both valves in the same manner.

20 Claims, 5 Drawing Sheets

INTEGRATED CHARGE AIR AND EGR VALVE

CROSS-REFERENCE TO RELATED APPLICATIONS

This application is a National Stage of International Application No. PCT/US2007/007092, filed Mar. 22, 2007. This application claims the benefit of U.S. Provisional Application No. 60/784,569, filed Mar. 22, 2006.

FIELD OF THE INVENTION

The present invention relates to a combination bypass valve assembly in which an actuator is used to control multiple valves and multiple bypasses.

BACKGROUND OF THE INVENTION

Due to both federal and state regulations, motorized vehicles today are limited to the amount of emissions in which they can release during operation. One way of reducing the amount of emissions released by the vehicle is to include an exhaust gas recirculation (EGR) valve in the vehicle's exhaust system. The EGR valve redirects at least a portion of the exhaust gas from the exhaust gas manifold of the engine, so that the exhaust gas is recirculated into the intake manifold of the engine along with fresh air. Furthermore, the EGR valve assembly can have multiple EGR valves in which one valve is a high pressure EGR valve and a second is a low pressure EGR valve. Whether the exhaust gas passes through the high pressure EGR valve or the low pressure EGR valve, the exhaust gas is directed to an air cooler prior to entering the intake manifold of the engine. The air cooler is used to control the temperature of the air entering the intake manifold due to the high temperature of the exhaust gas exiting the exhaust gas manifold and being recirculated through the EGR valve assembly.

However, it is desirable to bypass the air cooler in order to maintain a higher air temperature of the air entering the intake manifold under certain conditions. Thus, a bypass is needed so that the exhaust gas can be redirected around each air cooler. In order to control the amount of air passing through the individual bypasses, a valve is needed in each bypass to open and close the bypass depending on the vehicle operating conditions. The valves used to control the amount of airflow through the bypasses requires additional assembly and parts due to the valves themselves and the control mechanisms to control the valves.

Therefore, it is desirable to develop a combination bypass valve assembly in which the valves in both bypasses are controlled by a single actuator. It is also desirable to have a single actuator control both the bypass valve and the EGR valve. By controlling both valves with a single actuator, the number of parts and manufacturing time is reduced, when compared to an assembly which requires individual actuators for each individual valve.

SUMMARY OF THE INVENTION

The present invention relates to an engine assembly comprising an engine, a plurality of coolers, a plurality of bypasses, and at least one actuator. The engine has an exhaust manifold and an intake manifold. The gaseous fluid exiting the exhaust gas manifold is recirculated to the intake manifold. The exhaust gas passes through either an air cooler or a bypass. At least one actuator is operably connected to the plurality of bypasses, so that the actuator controls the flow of exhaust gas through both the first bypass and the second bypass. The bypasses have a valve which is actuated to control the flow of the gaseous fluid through the bypass as both the bypass and the cooler. Therefore, when a single actuator is used to control the valves in both bypasses, the valves in the bypasses have the same relationship with the inlets so that a single actuator movement will control both valves in the same manner.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
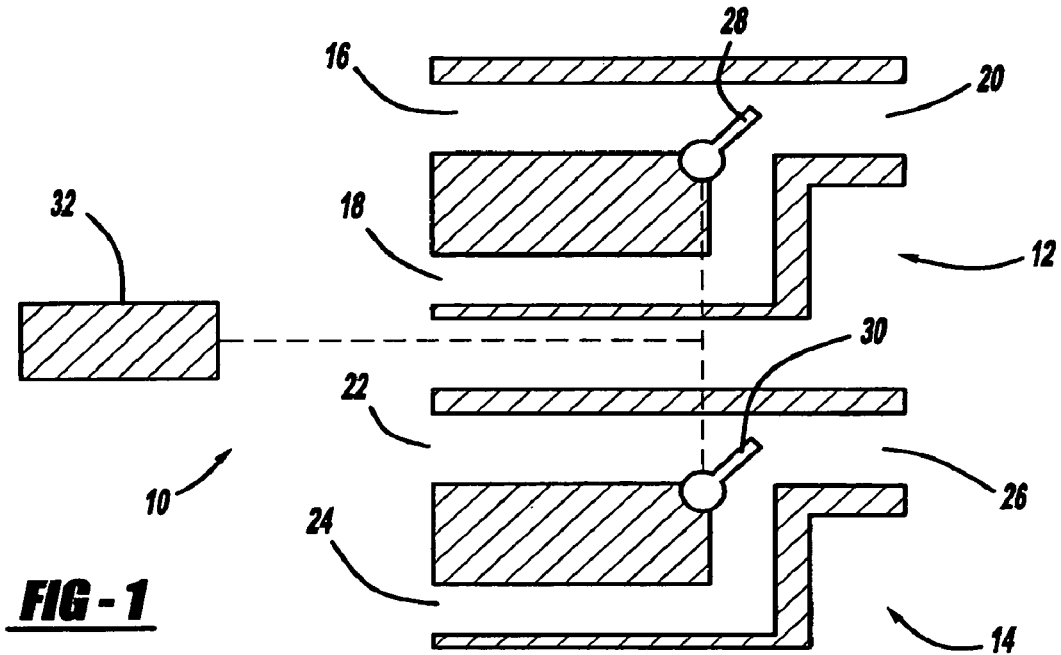
FIG. 1 is a schematic plan view of a combination bypass valve assembly where the valves are positioned intermediate to both inlets in accordance with a preferred embodiment of the present invention.

The following description of the preferred embodiment(s) is merely exemplary in nature and is in no way intended to limit the invention, its application, or uses.

Referring to the figures, a combination bypass valve assembly is generally shown at 10. The combination bypass valve assembly 10 has a first channel assembly 12 and a second channel assembly 14. The first channel assembly 12 has a first inlet 16 and a second inlet 18, which are connected to an outlet 20. Likewise, the second channel assembly 14 has a first inlet 22 and a second inlet 24, which are connected to an outlet 26.

The first channel assembly 12 has a first valve 28 located at the intersection of the first inlet 16, second inlet 18, and outlet 20. Likewise, the second channel assembly 14 has a second valve 30 located at the intersection of the first inlet 22, second inlet 24, and outlet 26. The first valve 28 and second valve 30 are used to control the amount of flow entering the respective outlet 20, 26, from the respective first inlet 16, 22 and second inlet 18, 24. At least one actuator 32 is used to control the first valve 28 and second valve 30. In a preferred embodiment, a single actuator 32 is used to control both the first valve 28 and the second valve 30. By using a single actuator 32, the number of parts required for the combination bypass valve assembly 10 is reduced when compared to a bypass valve assembly that requires a separate actuator for each valve. Thus, the manufacturing of the combination bypass valve assembly 10 is efficient and economical due to the reduction of parts needed to be assembled.

In reference to FIG. 1, the combination bypass valve assembly 10 is shown where the first valve 28 and second valve 30 are at an intermediate position where flow from both the first inlet 16, 22 and second inlets 18, 24 enter the respective outlet 20, 26. In reference to FIG. 2, the actuator 32 has positioned the first valve 28 and second valve 30 so as to almost completely close the respective second inlet 18, 24 and fully open the respective first inlet 16, 22. Thus, the actuator 32 also has the capability to position the first valve 28 and second valve 30 so that the first inlets 16, 22 are almost completely closed and the second inlets 18, 24 are fully open. It is also within the scope of the present invention for the valves 28, 30 to completely close the first inlets 16, 22 or the second inlets 18, 24. The single actuator 32 is used to control both the first valve 28 and second valve 30 with respect to the first inlets 16, 22 and the second inlets 18, 24 since both the first valve 28 and second valve 30 move in the same manner in order to alter the flow through the first channel assembly 12 and second channel assembly 14, respectively.

In any of the above embodiments, the actuator 32 is preferably connected to a control unit (not shown), such as but not limited to, an engine control unit (ECU). Thus, the ECU determines the current position of the actuator 32 and transmits a signal commanding the actuator 32 to alter positions in order to move the first valve 28 and second valve 30 based upon operating conditions of a motor vehicle (not shown). However, the control unit can be on the actuator 32 so that the actuator 32 determines its position and the actuator 32 determines how to alter positions in order to move the valves 28, 30.

Figure 3:
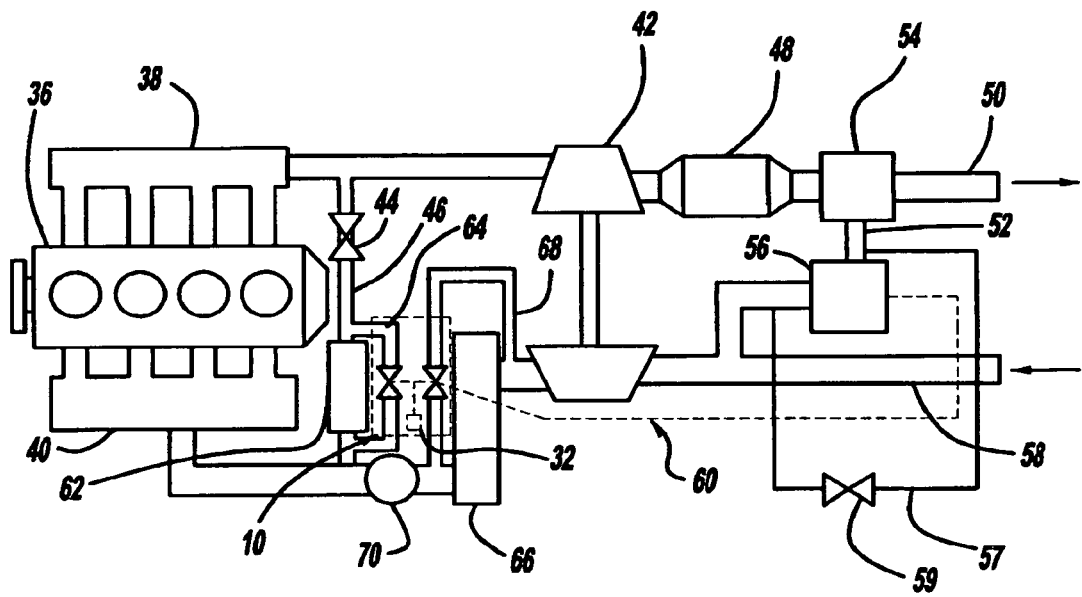
FIG. 3 is a schematic plan view of an exhaust gas recirculation assembly in accordance with a preferred embodiment of the present invention.

Referring to FIG. 3, in operation the combination bypass valve assembly 10 is used in an engine assembly. The engine assembly has an engine 36 which comprises an exhaust manifold 38 and an intake manifold 40. A turbine 42 and a first EGR valve or high pressure EGR valve 44 are operably connected to the exhaust manifold 38, such that the gaseous fluid or exhaust gas either flows through the turbine 42 or through a first EGR path 46 to the high pressure EGR valve 44. The exhaust gas that passes through the turbine 42 rotates the turbine 42 and then passes through a diesel particulate filter 48. The exhaust gas then passes through an exhaust pipe 50 or a second EGR path 52. The second EGR path 52 is known as a low pressure EGR path. The exhaust gas that passes through the exhaust pipe 50 exits the engine assembly 34. The exhaust gas that passes through the second EGR path 52 passes through a low pressure EGR valve module 54 that contains an EGR valve and a throttle valve for throttling the exhaust gas. Alternatively the EGR valve module 54 can be a single valve having both a throttle valve and exhaust gas recirculation valve aspect. Any suitable means can be used to direct the exhaust gas through either the exhaust pipe 50 or the second EGR path 52, such as but not limited to, an exhaust gas throttle valve or a combination of an exhaust gas throttle valve and a low pressure EGR valve which can be part of the EGR valve module 54.

Figure 8:
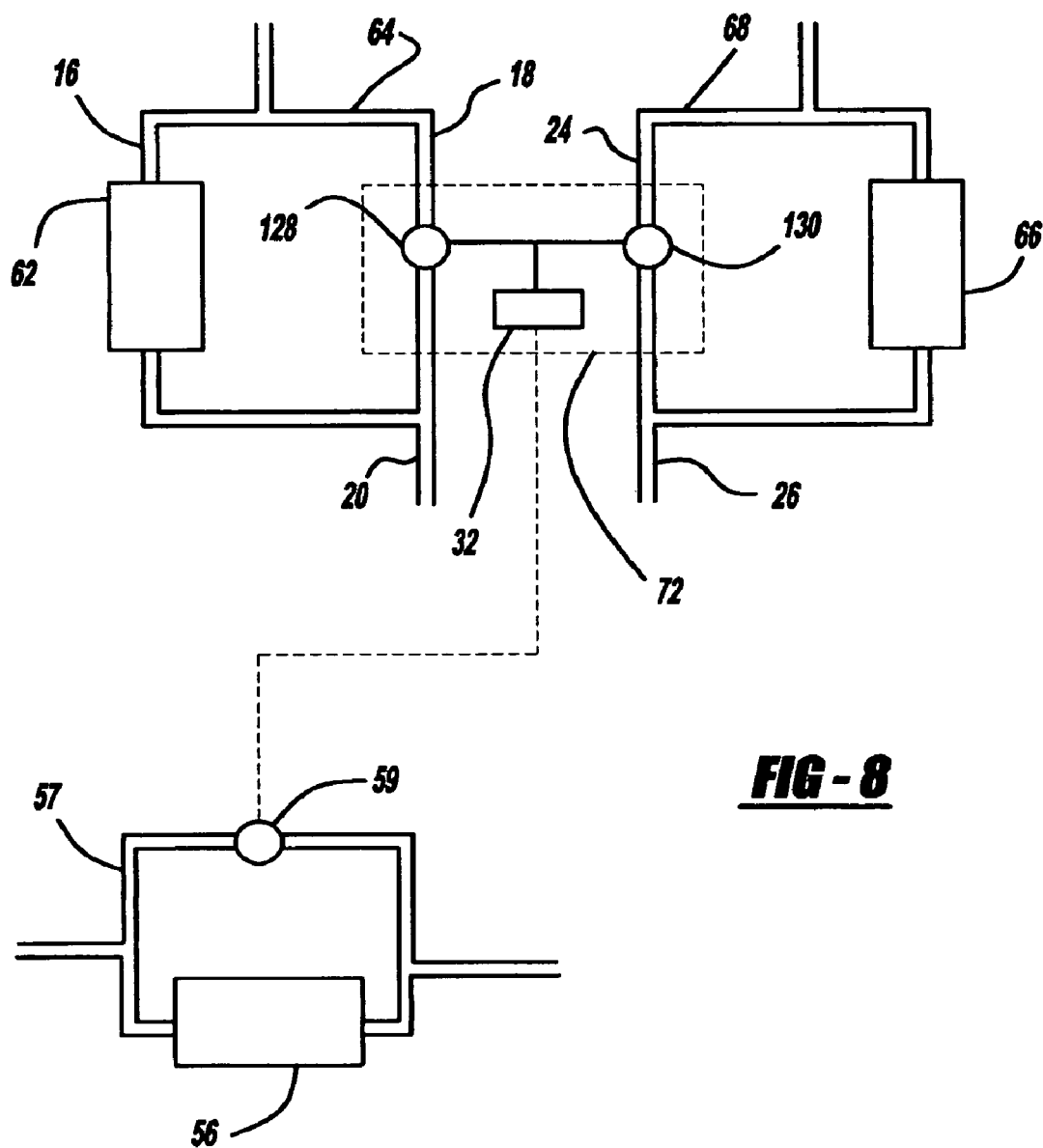
FIG. 8 is a schematic plan view of an actuator operably connected to three bypass valves.

The exhaust gas that passes through the second EGR path 52 can be directed in two directions much like the exhaust gas the passes through the first EGR path 46. FIG. 8 schematically illustrates this particular embodiment. The gas can pass through an EGR cooler 56 and mix with fresh air from an inlet 58. Alternatively the gas can bypass the EGR cooler 56 through a third bypass passage 57 or low pressure EGR bypass that has flow controlled by a third valve 59 or bypass valve. The third valve 59 can be controlled by its own actuator or it can be operably connected to the actuator 32 that controls the valves 28, 30 in order to provide synchronization of three bypass valves. The combination of exhaust gas and fresh air pass through a compressor 60, which is operably connected to the turbine 42. Thus, as the exhaust gas passes through and rotates the turbine 42, the compressor 60 rotates and compresses the exhaust gas and fresh air mixture.

However, the exhaust gas that passes through the high pressure EGR valve 44 continues down the first EGR path 46 to either a first cooler 62 or a first bypass 64. In a preferred embodiment, the first cooler 62 is an EGR cooler. After the exhaust gas passes through either the first cooler 62 or the first bypass 64, the exhaust gas then enters the intake manifold 40. Likewise, the exhaust gas and fresh air that exit the compressor 60 then passes through either a second cooler 66 or a second bypass 68. In a preferred embodiment, the second cooler 66 is a charged air cooler. The exhaust gas and fresh air that pass through either the second cooler 66 or the second bypass 68 mixes with the exhaust gas from the first EGR path 46 and enters the intake manifold 40. In a preferred embodiment, a throttle valve 70 is used to control the amount of flow entering the intake manifold 40 from the first EGR path 46 and the second EGR path 52. It should be appreciated that any predetermined number of coolers 62, 66 can be used in any predetermined combination of EGR coolers and charge air coolers.

Figure 2:
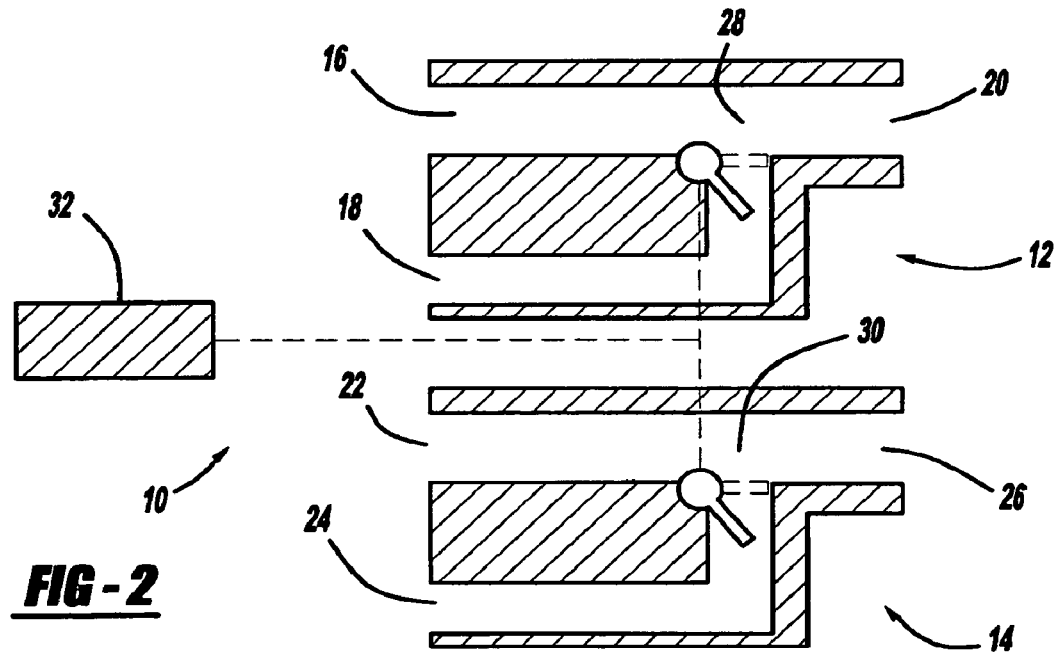
FIG. 2 is a schematic plan view of the combination bypass valve assembly where the valves are positioned to close either one of the inlets in accordance with a preferred embodiment of the present invention.

Referring to FIGS. 1-3, the combination bypass valve assembly 10 comprises the first cooler 62, the first bypass 64, the second cooler 66, and the second bypass 68. Therefore, exhaust gas passing through the first cooler 62 passes through the first inlet 16, and exhaust gas that passes through the first bypass 64 passes through the second inlet 18 and the exhaust gas exits through outlet 20 to enter the intake manifold 40. Likewise, the mixture of exhaust gas and fresh air that passes through the second cooler 66 passes through the first inlet 22, and the exhaust gas and fresh air mixture that passes through the second bypass 68 passes through the second inlet 24 and the exhaust gas and fresh air mixture exits through outlet 26 to enter the intake manifold 40. The actuator 32 controls both the first valve 28 and second valve 30 so that when the first valve 28 is blocking the first inlet 16 or first cooler 62 path, the second valve 30 is blocking the first inlet 22 or second cooler 66 path. Likewise, when the first valve 28 is blocking the second inlet 18 or the first bypass 64 path, the second valve 30 also blocks the second inlet 24 or the second bypass 68 path. Thus, a single actuator 32 is used to control the first valve 20 and second valve 30 when the valves 28, 30 are operably connected to the actuator 32 so that the valves 28, are positioned in relation to the cooler 62, 66 path and the bypass 64, 68 paths in the same manner. Therefore, both the first valve 28 and second valve 30 affect the intake air temperature into the intake manifold 40 in the same way.

Figure 4:
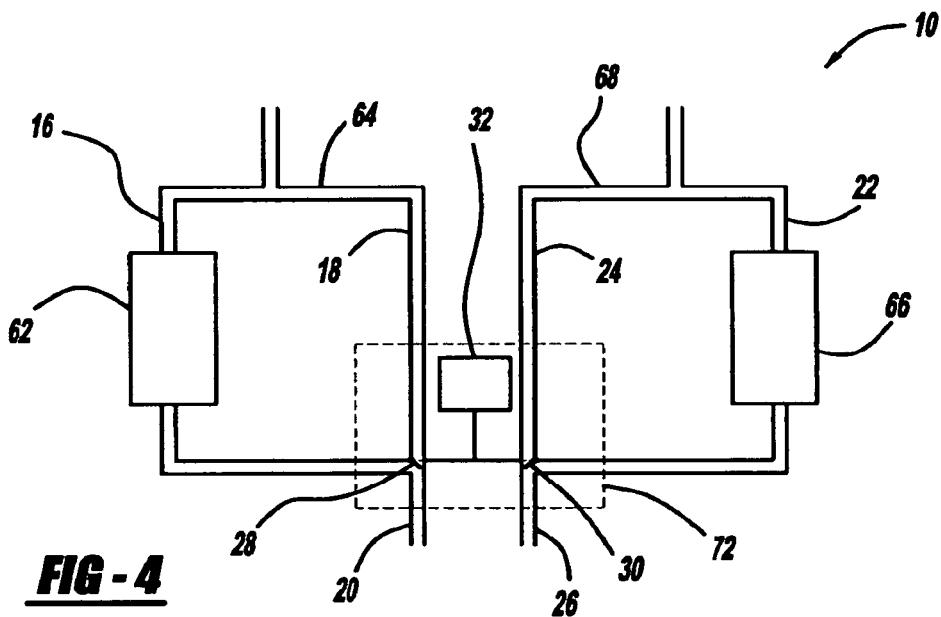
FIG. 4 is a schematic plan view of an assembly where a valve is placed at the junction of a cooler and a bypass in accordance with an embodiment of the present invention.

Referring to FIG. 4, the bypass valve assembly 10 is depicted in a preferred embodiment where a single actuator 32 controls both valves 28, 30 in a single housing 72. The inlets 16, 18, 22, 24 enter the housing 72 where the valves 28, 30 control the exhaust gas air flow to the outlets 20, 26 which exit the housing 72. Thus, the bypass channels 18, 24, the outlets 20, 26, the valves 28, 30, and the actuator 32 are all in the housing 72.

Figure 5:
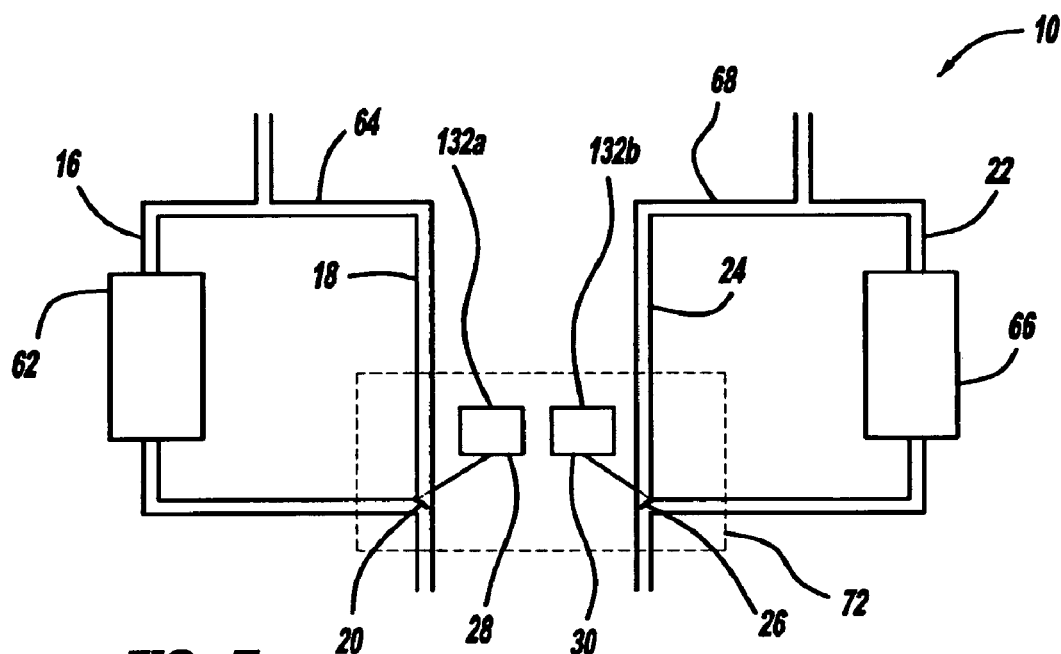
FIG. 5 is a schematic plan view of multiple actuators in a single housing operably connected to multiple valves in accordance with an embodiment of the present invention.

In an alternate embodiment, of the bypass valve assembly 10 is shown in FIG. 5 where a first actuator 132a controls the first valve 28 and a second actuator 132b controls the second valve 30 in the housing 72. By having multiple actuators 132a, 132b the valves 28, 30 do not have to be operated in the same way with respect to one another as they do when only a single actuator 32 is used. Thus, the first valve 28 can open the first bypass 18 while the second valve 30 has the second bypass 24 closed, or any combination thereof. Therefore, exhaust gas flowing from the first inlet 16 and the second inlet 18 is controlled by the first valve 28 and the first actuator 32a, while exhaust gas from the first inlet 22 and the second inlet 24 is controlled by a second valve 30 and the second actuator 32b, within the same housing 72.

Figure 6:
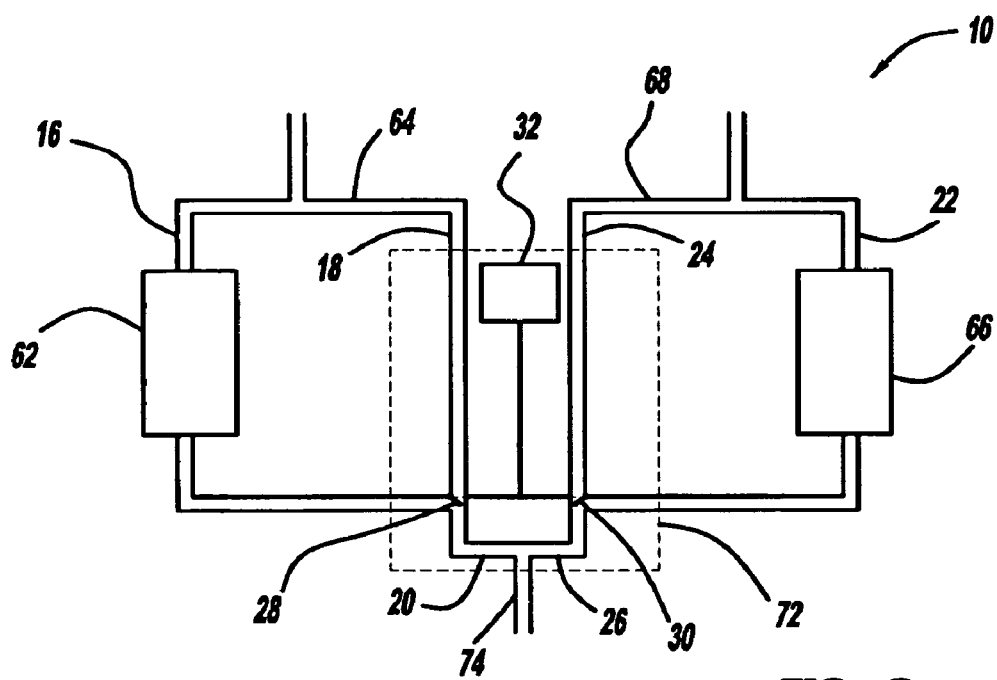
FIG. 6 is a schematic plan view of an engine assembly having an actuator housing with multiple inlets and a single outlet.

In reference to FIG. 6, an alternate embodiment of the bypass valve assembly 10 is shown is shown where the first outlet 20 and second outlet 26 are combined to form a single outlet 74 in the housing 72. Thus, exhaust gas enters the housing 72 through the first inlets 16, 24 and the second inlets 18, 22 and passes by the valves 28, 30 into the outlets 20, 26 where the exhaust gas then enters the main outlet 74 and exits the housing 72. All of the exhaust gas exits the housing 72 through the main outlet 74. As shown in FIG. 6, a single actuator 32 is used to control the valves 28, 30. However, it should be appreciated that the above embodiment described in FIG. 5 using multiple actuators 132a, 132b can be used incorporated into the embodiment shown in FIG. 6 which has the single housing 72 with the outlets 20, 26 forming the main outlet 74 to exit the housing 72.

Figure 7:
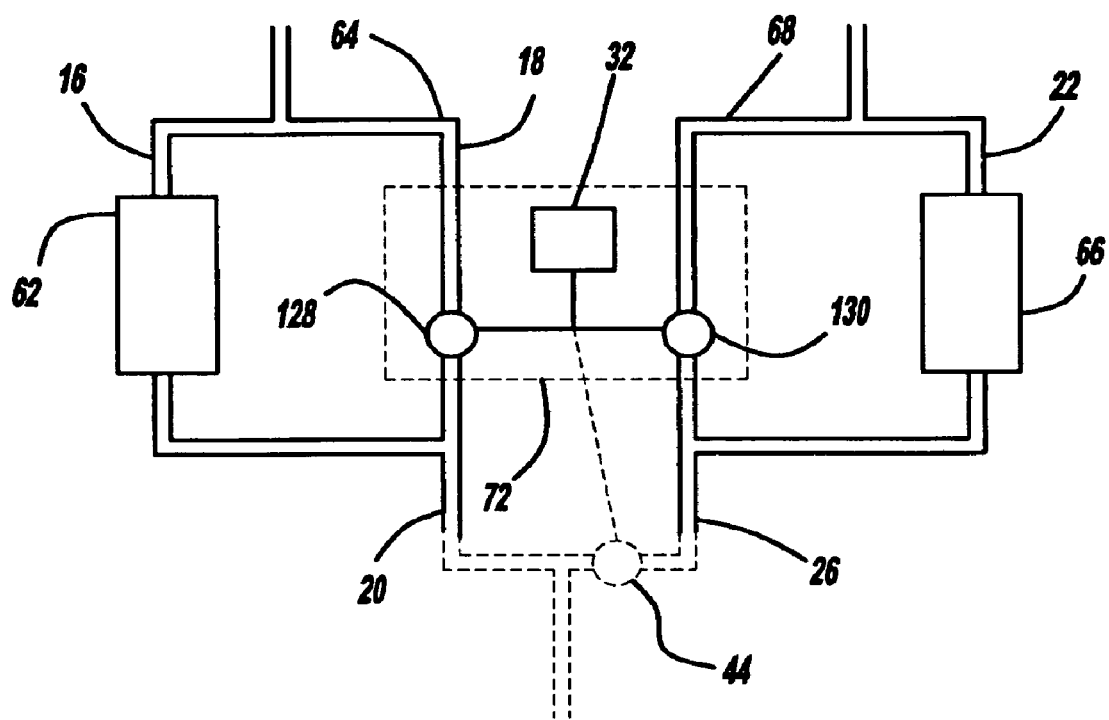
FIG. 7 is a schematic plan view of an actuator operably connected to valves in separate bypasses.

An alternate embodiment of the bypass valve assembly 10 is shown is shown in FIG. 7, where a first valve 128 is placed in the first bypass 18, and a second valve 130 is placed in the second bypass 24. Thus, the valves 128, 130 only control the flow of exhaust gas through the second inlets 18, 24. Therefore, exhaust gas is always passing through the first inlet 16, 22 and the cooler 62, 66 and into the outlets 20, 26. Typically the valves 128, 130 are on/off valves so that the second inlets 18, 22 is either completely on and the exhaust gas flows through the second inlets 18, 22, or completely off and no exhaust gas flows through the second inlets 18, 22. However, the valves 128, 130 can be valves which are controlled by the actuator 32 in a linear fashion so that the valves 128, 130 can be placed in an intermediate position where at least some exhaust gas flows through the second inlets 18, 24 in addition to being placed in a completely open or closed position. In addition, it should be appreciated that the above embodiment where multiple actuators 32 are used in a single housing 72 can be used to control the valves 128, 130.

With continued reference to FIG. 7, another alternative embodiment is shown in phantom, where the EGR valve 44 is placed on outlet 26 after inlets 22, 24 are connected. The EGR valve 44 is operably connected to the actuator 32 so that the single actuator 32 controls both valves 128, 130 and the EGR valve 44.

At times during the vehicle's operation, it is desirable to control the temperature of the air entering the intake manifold 40. One example is when the DPF filter 48 is being regenerated. Under this operating condition it is desirable to create or control the highest possible air temperatures in the intake manifold 40. The combination bypass valve assembly 10 with position actuators 32 substantially blocks the flow from the first inlets 16, 22 or the exhaust gas passes through the first cooler 62 or the second cooler 66. Thus, the exhaust gases passing through bypasses 64, 68 through the second inlet 18, 24 so that the temperature of the exhaust gas is not reduced by the coolers 62, 66 prior to entering the intake manifold 40.

Another example of a condition where it is ideal to control the temperature of the air entering the intake manifold is when the vehicle is operating in cold ambient temperatures at low engine speeds or loads or when there is cold engine coolant or cold start conditions. Under these operating conditions it is ideal to increase the temperature of the air entering intake manifold 40 in order to reduce combustion noise, reduce hydrocarbon emissions, reduce miss-firings of the engine 36 by substantially blocking the air passing through the first inlets 16, 22 or the air passing through the cooler 62, 68. Another example is during long engine overrun, it is desirable to prevent cooling of the combustion chamber by air from the cooler 62, 68. Thus, the air entering the intake manifold 40 passes through the bypass channels 64, 68 so that the valves 28, 30 substantially block the air passing through the coolers 62, 66. Yet another example is when the vehicle is running the engine 36 at the highest EGR rates, it is desirable to prevent miss-firing of the engine 36 due to low compression temperatures. Thus, it is desirable to maintain a higher temperature of air entering the intake manifold 40 by substantially closing the first inlets 16, 22 from the cooler 62, 66. The above descriptions are merely examples of using the combination bypass valve assembly 10, and it is within the scope of the present invention to include other conditions where it is desirable to control the temperature of the air entering the intake manifold 40.

The operable connection between the actuator 32, the valves 28, 30, 128, 130, and the EGR valves 44, 54 can be a mechanical connection, a pneumatic connection, a hydraulic connection or an electrical connection. An example of the mechanical connection is, but not limited to, the actuator 32 being connected to a Bowden cable operably connected to the EGR valves 44, 54 and/or the bypass valves 28, 30, 128, 130. These types of connections are described in greater detail in a patent application having the same inventor, Volker Joergl, filed on Mar. 22, 2006, entitled "Two Component Low Pressure EGR Module," hereby incorporated into this application by reference.

An alternate embodiment of the bypass valve assembly 10 is shown is shown in FIG. 8, where the single actuator 32 is used to control the first and second valves 128, 130 and the bypass valve 59 located in the bypass passage 57 for bypass exhaust gas around the EGR cooler 56 in the second EGR path 52.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control valve assembly for an engine including an exhaust manifold and an intake manifold, wherein gaseous fluid is routed into said intake manifold and gaseous fluid exits through said exhaust manifold, said control valve assembly comprising;
    at least one first fluid cooler and at least one second fluid cooler;
    a first bypass for bypassing of gaseous fluid around said at least one first fluid cooler;
    a second bypass for bypassing of gaseous fluid around said at least one second fluid cooler;
    at least a first valve operably associated with said first bypass and at least a second valve operably associated with said second bypass, said first and second valves controlling the flow of gaseous fluid between said first and second bypasses and said at least one first fluid cooler and said at least one second fluid cooler, respectively; and an actuator operably connected to said first and second valves for controlling the flow of gaseous fluid.

2. The control valve assembly of claim 1, wherein said at least one first fluid cooler and said at least one second fluid cooler are one selected from the group comprising a charge air cooler, an exhaust gas recirculation cooler, a single said gaseous fluid cooler, a single charge air cooler, a plurality of gaseous fluid coolers, a plurality of charge air coolers or predetermined combinations thereof.

3. The control valve assembly of claim 1, wherein said first valve is at a junction of said at least one first fluid cooler and said first bypass, and said second valve is at a junction of said at least one second fluid cooler and said second bypass.

4. The control valve assembly of claim 1 further comprising an actuator housing, wherein said actuator is inside said actuator housing.

5. The control valve assembly of claim 4, wherein said valve is in said actuator housing.

6. The control valve assembly of claim 4, wherein said actuator further comprises a first actuator and a second actuator which are inside said actuator housing.

7. The control valve assembly of claim 4, wherein said first bypass and said at least one first fluid cooler connect to create a first outlet from said actuator housing, and said second bypass and said at least one second fluid cooler connect to create a second outlet from said actuator housing.

8. The control valve assembly of claim 7, wherein said first outlet and said second outlet combine in said actuator housing to create a main outlet from said actuator housing.

9. The control valve assembly of claim 1, wherein said actuator further comprises a plurality of actuators operably connected to act as one.

10. The control valve assembly of claim 1, wherein said actuator is at least one of a mechanical actuator, a pneumatic actuator, a hydraulic actuator and an electrical actuator.

11. An control valve assembly for an engine including an engine having an exhaust manifold and an intake manifold, wherein gaseous fluid enters through said intake manifold and gaseous fluid exits through said exhaust manifold, said control valve assembly comprising;

a first fluid cooler and a second fluid cooler;

a first bypass for bypassing of gaseous fluid around said first fluid cooler, and a second bypass for bypassing of gaseous fluid around said second fluid cooler, wherein at least one of said first and second fluid coolers is a charge air cooler and the other is an exhaust gas recirculation cooler;

at least a first valve operably associated with said first bypass and a second valve operably associated with said second bypass, said first and second valves controlling the flow of gaseous fluid between said first and second bypasses and said first and second gaseous fluid coolers, respectively; and an actuator operably connected to at least said first valve and said second valve for controlling the flow of gaseous fluid.

12. The control valve assembly of claim 11, wherein a first actuator and a second actuator are inside an actuator housing.

13. The control valve assembly of claim 12, wherein said valve is inside said actuator housing.

14. The control valve assembly of claim 11 further comprising at least one exhaust gas recirculation valve operably connected to said exhaust gas recirculation cooler and one of said first or second bypass.

15. A control valve arrangement for an engine including an exhaust manifold and an intake manifold, wherein gaseous fluid is routed into said intake manifold and gaseous fluid exits through said exhaust manifold, comprising:

a first fluid cooler, a second fluid cooler and a third fluid cooler;

a first bypass for bypassing of gaseous fluid around said first fluid cooler;

a second bypass for bypassing of gaseous fluid around said second fluid cooler;

a third bypass for bypassing of gaseous fluid around said third fluid cooler;

a first valve operably associated with said first bypass, a second valve operably associated with said second bypass, and a third valve operably associated with said third bypass, and an actuator operably connected to said first valve, said second valve and said third valve for controlling the flow of gaseous fluid through said first bypass, said second bypass and said third bypass.

16. The control valve arrangement of claim 15 further comprising a single housing containing said actuator, said first valve and said second valve, wherein said third valve is in a separate location outside of said housing but is operably connected to and controlled by said actuator.

17. The control valve assembly of claim 16, wherein said first fluid cooler, said second fluid cooler and said third fluid cooler are each one selected from the group comprising a charge air cooler, an exhaust gas recirculation cooler, a single said gaseous fluid cooler, a single charge air cooler, a plurality of gaseous fluid coolers, a plurality of charge air coolers or predetermined combinations thereof.

18. The control valve assembly of claim 16, wherein said first bypass and said first fluid cooler connect to create a first outlet from said single housing, and said second bypass and said second fluid cooler connect to create a second outlet from said single housing.

19. The control valve assembly of claim 18, wherein said first outlet and said second outlet combine in said actuator housing to create a main outlet from said actuator housing.

20. The control valve arrangement of claim 15 wherein said first bypass is a high pressure cooler bypass, said second bypass is a charge air cooler bypass and said third bypass is a low pressure cooler bypass.

* * * * *